(12) United States Patent
Olgiati et al.

(10) Patent No.: US 10,891,525 B1
(45) Date of Patent: Jan. 12, 2021

(54) STREAMING-BASED DEEP LEARNING MODELS FOR COMPUTER VISION TASKS

(71) Applicant: Amazon Technologies, Inc., Seattle, WA (US)

(72) Inventors: Andrea Olgiati, Gilroy, CA (US); Jia Bi Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 15/706,237

(22) Filed: Sep. 15, 2017

(51) Int. Cl.
| | |
|---|---|
| *G06K 9/62* | (2006.01) |
| *G06T 9/00* | (2006.01) |
| *G06K 9/68* | (2006.01) |
| *G06N 3/04* | (2006.01) |
| *G06T 7/13* | (2017.01) |
| *G06T 7/174* | (2017.01) |

(52) U.S. Cl.
CPC ........ *G06K 9/6281* (2013.01); *G06K 9/6202* (2013.01); *G06K 9/6857* (2013.01); *G06N 3/0454* (2013.01); *G06T 9/002* (2013.01); *G06T 7/13* (2017.01); *G06T 7/174* (2017.01); *G06T 2207/10024* (2013.01); *G06T 2207/20021* (2013.01); *G06T 2207/20081* (2013.01); *G06T 2207/20084* (2013.01); *G06T 2207/20088* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2002/0076088 A1* | 6/2002 | Tsai .................. | G06K 9/00288 382/118 |
| 2004/0267781 A1* | 12/2004 | Smolgovsky .......... | G06Q 10/02 |
| 2017/0365093 A1* | 12/2017 | Stacey .................. | G06T 3/4092 |

OTHER PUBLICATIONS

Taubman, JPEG2000: Standard for Interactive Imaging, IEEE 2002 (Year: 2002).*
Kai Huang et al, "Off-line Signature Verification Based on Geometric Feature Extraction and Neural Network Classification", Pattern Recognition 1997 (Year: 1997).*
Taubman, "Architecture, Philosophy and Performance of JPIP: Internet Protocol Standard for JPEG2000", VCIP 2003 (Year: 2003).*

* cited by examiner

*Primary Examiner* — Mark Roz
(74) *Attorney, Agent, or Firm* — Lowenstein Sandler LLP (57) ABSTRACT

A method and system for processing images by a neural network are provided. A first computer can sequentially transfer at least two versions of an image having increasingly greater resolution to a second computer. The second computer performs an image identification process on each of the sequentially transferred at least two versions until the image is identified.

9 Claims, 8 Drawing Sheets

STREAMING-BASED DEEP LEARNING MODELS FOR COMPUTER VISION TASKS

BACKGROUND

Deep learning neural networks are employed to analyze an image to determine if an object is present in the image. To do so, an image is pushed through a neural network trained to detect one or more objects. The trained neural network is configured to perform operations (e.g., matrix multiplications) using a set of learned parameters (resulting from a training phase) to determine if an object is detected. To process an entire image, these operations are performed by the trained neural network on each of the pixels to generate the object classification label, resulting in a significant computational expense (e.g., ten billion floating point operations). In this regard, every pixel of the image is analyzed to identify patterns in the image (e.g., shapes, sizes, colors, etc.) for purposes of classifying and labeling objects in the image. In some cases multiple trained network networks are implemented in a distributed configuration with multiple computing resources that communicate over a network. As deep learning algorithms need to be scaled out in a distributed manner, the network overhead between computers is a factor.

Multiple computers organized in a distributed configuration are used to provide the necessary computational resources for implementing the deep learning neural networks. As deep learning algorithms, implemented by the deep learning neural networks, are scaled out in a distributed fashion, the ability to reduce network overhead becomes important.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must) Similarly, the words "include," "including," and "includes" mean including, but not limited to.

DETAILED DESCRIPTION

Embodiments described herein relate to processing images using a deep neural network having multiple processing layers (e.g., multiple sets of operations) configured to detect one or more objects or concepts in an image. The deep neural network can be used to perform multiple computer vision tasks (and/or image processing tasks) on an image as part of a deep learning (DL) algorithm. A computer vision task can be any operation or set of operations for processing digital images to ultimately make a decision regarding the content in the image, such as analyzing the image to detect an object in the image and to classify the object (e.g., determine that the object is a dog). Deep learning algorithms can have many different computer vision tasks (distributed over multiple hosts) to detect or recognize objects in the images and classify these objects (including facial recognition or facial expressions). These computer vision tasks can be performed independently and can be scaled over a distributed system of multiple computers. As deep learning algorithms, implemented by the deep learning neural networks, are scaled out in a distributed fashion, the ability to reduce network overhead becomes important. The embodiments described herein are directed to reducing network overhead between the multiple computers of the deep neural network. In one embodiment, a first computer sequentially transfers at least two versions of a first image having increasingly greater resolution to a second computer. It should be noted that the "resolution," as used herein, is not strictly "pixel resolution" of an image. Pixel resolution is a number of recorded pixels that yields a final image and is often expressed as a set of two positive integer numbers, where a first number is the number of pixel columns (width) and a second number is the number of pixel rows (height). Rather, the resolution in the embodiments described herein may refer to the fact that the particular version of the image may include less data than an entire data set of the entire image stored at full resolution at the first computer. For example, an image that is compressed in JPEG may be represented in terms of frequency components of the image, such as a constant component and higher frequency components. Instead of transferring the entire image, the embodiments described herein may start by sending the one or more values corresponding to a constant frequency component (or one of the lower frequency components) of the image and sequentially transfer additional values corresponding to increasingly higher frequency components to the second computer in order to sequentially transfer versions of the image having increasingly greater resolution to the second computer, as described herein. Although the values of the one or more of the frequency components transferred to the second computer may yield a version of the first image with an effective pixel resolution that is lower than a pixel resolution of the first image stored at the first computer, the embodiments described herein are not necessarily sending a first version of the first image with a first pixel resolution and then sending a second version of the first image with a second pixel resolution. However, in some embodiments, the images may be processed in such a way as to send a representative pixel value for a group of pixels where the group of pixels defines a patch of a fixed or variable size. In these embodiments, it may be seen that a first image with a first pixel resolution is being transferred for the first version and a second image with a second pixel resolution is being transferred subsequently. Additional details regarding the lower-resolution versions of the first image are described below with respect to the depicted embodiments. In response to receiving the sequentially transferred at least two versions, the second computer performs an image identification process on each of the sequentially transferred at least two versions until the image is identified. Some of the embodiments described herein set forth a patch-based streaming protocol among the multiple computers running the DL algorithm so that a receiving computer can start processing an image before the image can be completely downloaded from a transferring computer in the distributed network. This reduces an overall latency of a single request to process a sufficiently large image.

Also described herein are embodiments of techniques of first host transferring lower-resolution copies of an image to a second host in a distributed system that implements a deep learning algorithm so the second host can start a computer vision task earlier in time than it would take the image at full resolution to be transferred to the second host. Conventionally, the first host would transfer a copy of the image at full resolution to the second host and the second host could not start the computer vision task until the image at full resolution was transferred in its entirety. After transferring a first lower-resolution copy of the image to the second host, the first host can transfer incrementally higher resolution copies of the image to the second host for additional processing for/by the computer vision task. The first host can stop transferring the incrementally higher resolution copies when a notification is received, such as an indication that the computer vision task has completed (or for other defined conditions). As described herein, the embodiments described herein are not limited to computer visions tasks of DL algorithms or DL models, these embodiments may be deployed to improve latency and reduce network overhead incurred by other distributed processes, such as any image processing tasks that incur network overhead by transferring images between two computers. In some further embodiments, the patch-based streaming protocol can be complemented with a plugin to help compression and decompression of the images for transport to further reduce latency.

A deep neural network is an artificial neural network with multiple hidden layers of units between an input layer and an output layer. In one embodiment, the deep neural network processes data on a layer-by-layer basis, wherein a set of operations (e.g., a layer) is applied to the pixel information of an image to identify one or more labels for the image. In one embodiment, as the layer-by-layer processing continues, information from each respective layer is aggregated. In one embodiment, an aggregated set of computation values is built for the frame as the layer-by-layer processing of the neural network proceeds. For example, the output or results of a first layer (e.g., a set of computations including one or more labels) may be used as an input for a subsequent layer, where an additional set of operations are performed on pixels of the image at the subsequent layer. In one embodiment, more and more specific data is being analyzed as the layers progress, such as shapes, edges, parts of objects, etc. In one embodiment, for example, at a last layer, full objects are analyzed to enable object classification.

In one embodiment, a neural network may be configured to identify a particular object. For example, a neural network may be configured to determine if an image includes or can be classified as a "dog" (i.e., determining if there is a "dog" in the image). In one embodiment, the processing is applied to one or more layers to determine if, based on the information analyzed in that layer, the image can be classified as a "dog". In one embodiment, the neural network is configured to take low level pixel information of an image and perform a high-level classification of the image as a concept (e.g., determine it is an image of a dog). In one embodiment, as multiple layers are analyzed, the additional information determined for the respective layers is aggregated by the neural network until a final classification is made.

In certain image processing systems, each image (or a frame in a video) is processed by the trained neural network independently. In this architecture, an image can be fully processed by multiple computers. As such, there are instances when a large amount of processing is performed with regard to an image, but the processing may be performed by different computers of the distributed system (i.e., transferring the image to multiple computers in the neural network). Each computer that processes the image performs their respective computer vision task on a complete image. Thus, the entire image has to be downloaded to each of these computers. Accordingly, processing of the image in this manner results in transport inefficiencies and increased latency since the computer has to wait until the entire image is downloaded. Using the embodiments described herein, a first computer can sequentially transfer at least two versions of a first image having increasingly greater resolution to a second computer. The second computer can start the image processing task on the first image at the lower resolution sooner than it would take to download the first image at full resolution. For example, the second computer can start an image identification process on the first sequentially transferred version of the image. The second computer can continue to receive the increasingly greater resolution version until the image is identified. This improves the transport efficiency between the multiple computers and reduces an overall latency of a single request to process a sufficiently large image.

Figure 1:
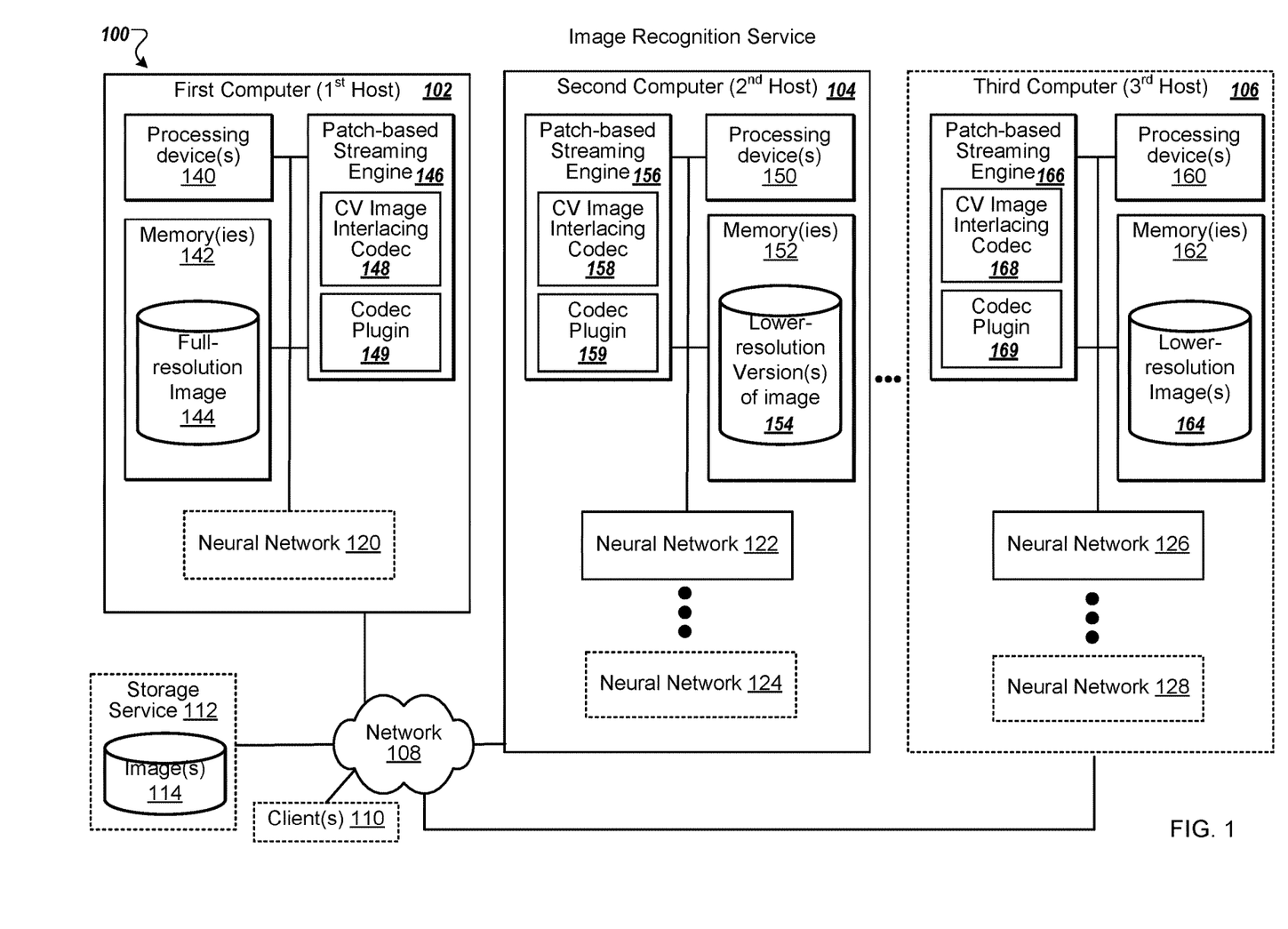
FIG. 1 is a block diagram illustrating various components of an image recognition service using a patch-based streaming protocol to transfer images between multiple computers organized in a distributed configuration according to one embodiment.

FIG. 1 is a block diagram illustrating various components of an image recognition service 100 using a patch-based streaming protocol to transfer images between multiple computers organized in a distributed configuration according to one embodiment. The image recognition service includes at least a first computer 102 (also referred to as first host) and a second computer 104 (also referred to as second host). Alternatively, the image recognition service may include more than two computers, such as illustrated by an optional third computer 106. The first computer 102 includes one or more processing devices 140 (hereinafter "processing device 140") and one or more memories 142 (hereinafter "memory 142"). The memory 142 may store data, instructions, or any combination thereof. The first computer 102 hosts a neural network 120. In one embodiment, the processing device 140 and the memory 142 are configured to execute and store instructions associated with the functionality of the various components, services, and modules of the neural network 120. The neural network 120 may be trained to detect one or more objects in an image (or a video). The neural network 120 can be a deep neural network having multiple processing layers (e.g., multiple sets of operations) configured to detect one or more objects or concepts in an image. The deep neural network can be used to perform one or more computer vision tasks on an image as part of a deep learning (DL) algorithm. In another embodiment, the neural network 120 is used to perform other image processing tasks that are not necessarily for computer vision task or computer vision processing. In one embodiment, the neural network 120 performs an image identification process on a full-resolution image 144 stored in the memory 142. Since the full-resolution image 144 is stored locally at the first computer 102, there is no transport latency to perform the image identification process on the full-resolution image 144 by the neural network 120. However, as noted above, because deep learning algorithms can be scaled out in a distributed manner, a second computer 104 could request the full-resolution image 144 from the first computer 102 to perform an image identification process (or another aspect of the same image identification process performed by the neural network) of a neural network 122. The neural network 122 may be similar to the neural network 120 described above. In one implementation, the first computer 102 can transfer the full-resolution image 144 over a network 108 (e.g., public network or private network) to the second computer 104. The network 108 may be any suitable network (not shown), including, for example, the Internet, intranets, extranets, wide area networks (WANs), local area networks (LANs), wired networks, wireless networks, or other suitable networks, etc., or any combination of two or more such networks. The transfer of the full-resolution image 144 over the network 108 may increase network traffic and cause latency for the second computer 104 to download the full-resolution image 144 before performing the image identification process by the neural network 122. As described herein, a patch-based streaming engine 146 can send lower-resolution versions 154 of the full-resolution image 144 to the second computer 104 to reduce network traffic and reduce latency. Additional details regarding the patch-based streaming engine 146 are described below. The patch-based streaming engine 146 may include processing logic that may comprise hardware (e.g., circuitry, dedicated logic, programmable logic, microcode, etc.), software (e.g., instructions run on a processing device), or a combination thereof.

In the depicted embodiment, the second computer 104 includes one or more processing devices 150 (hereinafter "processing device 150") and one or more memories 152 (hereinafter "memory 152"). The memory 152 may store data, instructions, or any combination thereof. The processing device 150 and memory 152 are configured to execute and store instructions associated with the functionality of the various components, services, and modules of the neural network 120. The neural network 120 may be trained to detect one or more objects in an image (or a video). The neural network 120 can be a deep neural network having multiple processing layers (e.g., multiple sets of operations) configured to detect one or more objects or concepts in an image. The deep neural network can be used to perform one or more computer vision tasks on an image as part of a DL algorithm. Like the neural network 120, the neural network 122 may be used to perform other image processing tasks that are not necessarily for computer vision processing. Unlike the neural network 120 that performs an image identification process on the full-resolution image 144, the neural network 122 performs an image identification process on a lower-resolution version 154 of the full-resolution image 144 that is transferred to the second computer 104 from the first computer 102 and stored in the memory 152. Since the full-resolution image 144 is stored remotely at the first computer 102, the second computer 104 could request the full-resolution image 144 to be downloaded from the first computer 102. The transfer of the full-resolution image 144 from the first computer 102 to the second computer 104 would have a first amount of latency before the neural network 122 could start the image identification process (or an image processing task of the image identification process). In one embodiment, the neural network 120 may be implemented using a central processing unit (CPU) or a graphic processing unit (GPU) configured to detect an object. In one embodiment, the CPU and/or GPU correspond to processing device 140. In one embodiment, the neural network 120 is a set of instructions stored in memory 142 and executable by the processing device 140. In one embodiment, the neural network 120 may be implemented as dedicated hardware components (e.g., a deep learning processor using GPUs or Application-specific Integrated Circuits (ASICs). In one embodiment, the neural network 120 is configured to perform the functionality described herein with respect to image identification processes, image processing tasks, computer vision tasks, or the like.

In one embodiment, instead of transferring the full-resolution image 144 to be processed by the image identification process by the neural network 122, the first computer 102 can start transferring a lower-resolution version 154 to the second computer 104 so the neural network 122 can start the image identification process on the lower-resolution version 154, instead of waiting for the full-resolution image 144 to be downloaded from the first computer 102. In one embodiment, a patch-based streaming engine 146 of the first computer 102 can process the full-resolution image 144 to generate a first version of the image having a first resolution, a second version of the image having a second resolution, and so forth, where each of the versions having increasingly greater resolutions. The patch-based streaming engine 146 can decode the full-resolution image 144 using a codec plugin 149, such as a JPEG codec when the full-resolution image 144 is stored as a JPEG file. Alternatively, the full-resolution image 144 may be stored using other compression technologies or the full-resolution image 144 can be stored as raw image data. The codec plugin 149 can decode the image data to generate the first version of the image at the first resolution. After creating the first version of the image, the codec plugin 149 can compress the first version even further before transport. The patch-based streaming engine 146 transfers the first version of the image over the network to the second computer 104. The second computer 104 receives the first version of the image and can start performing the image identification process on the first version. The patch-based streaming engine 146 sequentially generates versions of the image having increasingly greater resolutions and transfers the versions to the second computer 104 until the image is identified by the neural network 122 or the image identification process ends. For example, the second computer 104 can send a notification to the patch-based streaming engine 146 that the image identification process has ended or other information to the first computer 102 that it can stop generating version of the image or stop transferring the versions of the image to the second computer 104. The transfer of the first version of the full-resolution image 144 from the first computer 102 to the second computer 104 would have a second amount of latency that is less than the first amount of latency to transfer the full-resolution image 144. As such, the overall latency to start the image identification process by the neural network 122 would be reduced, as compared to the latency needed to download the full-resolution image 144 from the first computer 102.

In another embodiment, the second computer 104 receives a first lower-resolution version of the full-resolution image 144 over the network 108. The second computer 104 starts execution of an image processing task of an artificial intelligence model using the first lower-resolution version by the second computer 104. The second computer 104 receives a second lower-resolution version of the full-resolution image 144 over the network 108, the second lower-resolution version having a higher resolution than the first lower-resolution version. The second computer 104 continues execution of the image processing task of the artificial intelligence model using the second lower-resolution version. In one embodiment, the artificial intelligence model is a deep learning model. In another embodiment, the artificial intelligence model is a machine learning (ML) model.

In one embodiment, the patch-based streaming engine 146 includes a computer vision (CV) image interlacing codec 148. Interlacing (also referred to as interleaving) is a technique for encoding and decoding an image such that a person who has partially received the image sees a degraded copy of the entire image. Similar in concept to interlacing, the CV image interlacing codec 148 uses a technique for encoding and decoding an image such that a computer that has partially received the image can use computer vision to "figuratively" see a degraded copy of the entire image. In particular, the CV image interlacing codec 148 can encode a first version of the full-resolution image 144 at a first resolution for the patch-based streaming engine 146 to transfer to the second computer 104. The first version is a first lower-resolution version 154 of the full-resolution image 144. Subsequently the CV image interlacing codec 148 can encode a second version of the full-resolution image 144 at a second resolution for the patch-based streaming engine 146 to transfer to the second computer 104. The first version is a second lower-resolution version 154 of the full-resolution image 144. The CV image interlacing codec 148 can continue to encode additional versions of the full-resolution image 144 at increasingly higher resolutions for the patch-based streaming engine 146 to transfer to the second computer 104.

In another embodiment, before being transferred over the network 108, the patch-based streaming engine 146 may include the codec plugin 149 to compress the first lower-resolution version (and subsequent lower-resolution versions) in a compressed file or a portion of the compressed file, for example, to further reduce latency during transport.

The coded plugin 159 at the second computer 104 can decompress the compressed file (or the portion of the file) to extract the first lower-resolution version of the image for processing by the neural network 122.

The second computer 104 can also execute a patch-based streaming engine 156, including a CV image interlacing codec 158 and a codec plugin 159. In particular, the CV image interlacing codec 158 can decode the first version received by the patch-based streaming engine 156 from the first computer 102. The first version is a first lower-resolution version 154 of the full-resolution image 144. The CV image interlacing codec 158 of a patch-based streaming engine 156 executed by the processing device 150 of the second computer 104 receives and decodes the first version of the image for the neural network 122. This allows the neural network 122 to start the image identification process. Subsequently the CV image interlacing codec 158 can decode a second version of the full-resolution image 144 at a second resolution received by the patch-based streaming engine 156 from the first computer 102. The first version is a second lower-resolution version 154 of the full-resolution image 144. The CV image interlacing codec 158 can continue to decode additional versions of the full-resolution image 144 at increasingly higher resolutions received by the patch-based streaming engine 156 from the first computer 102. The lower-resolution versions 154 of the image can be receives as versions of the image encoded at increasingly higher resolutions. In embodiments where the versions are additionally compressed by the coded plugin 149, the codec plugin 159 of the patch-based streaming engine 156 can decompress the compressed versions before being processed by the neural network 122.

In a further embodiment, the patch-based streaming engine 146 can transfer the lower-resolution versions 154 of the full-resolution image 144 to the second computer 104 using unicast transmissions. Unicast refers to a one-to-one transmission from one point in the network to another point in the network; one sender identified by a first network address and one received identified by a second network address.

In one embodiment, the patch-based streaming engine 146 can transfer the lower-resolution versions 154 of the full-resolution image 144 to the second computer 104 to be processed by the neural network 122, as well as one or more additional neural networks 124 hosted by the second computer 104. In another embodiment, the patch-based streaming engine 146 can transfer the lower-resolution versions 154 of the full-resolution image 144 to the second computer 104, as well as other computers, such as a third computer 106 illustrated in FIG. 1. The patch-based streaming engine 146 can transfer the same lower-resolution versions 154 or different lower-resolution versions 164 of the full-resolution image 144 to the third computer 104. In another embodiment, the patch-based streaming engine 146 can transfer the lower-resolution versions 164 of the full-resolution image 144 to the third computer 104 to be processed by the neural network 126, as well as one or more additional neural networks 126 hosted by the third computer 106.

When transferring the same lower-resolution versions, the patch-based streaming engine 146 can transfer the lower-resolution versions to both the second computer 104 and the third computer 106. The transmission to multiple receivers can be done using broadcast transmissions, multicast transmissions, anycast transmissions, or geocast transmissions. The patch-based streaming engine 146 can use a broadcast transmission of a single datagram in for a one-to-all endpoints fashion with multiple endpoints associated with a broadcast address. The network may automatically replicate datagrams to reach multiple recipients of the broadcast, which could be an entire network subnet. The patch-based streaming engine 146 can use multicast transmissions with multicast addressing; a one-to-many-of-many association. The patch-based streaming engine 146 can route datagrams simultaneously in a single transmission to many recipients, such as a subset of nodes. The patch-based streaming engine 146 can use anycast addressing (a one-to-one-of-many association) to route datagrams to any single member of a group of potential receivers that are all identified by the same destination address. For example, a routing algorithm may select the single receiver from the group based on which is the nearest according to some distance measure. The patch-based streaming engine 146 can use geocast transmissions to deliver information to a group of destinations in a network identified by their geographical locations.

In one embodiment, the first computer 102 receives a request from a client device 110 to process an image. The client device 110 may have already uploaded the image to the first computer 102 and the first computer 102 stores the image as a full-resolution image 144 in memory 142. In another embodiment, the full-resolution image 144 is stored as one of the multiple images stored in a storage service 112. In one embodiment, the first computer 102 may be part of a storage service that stores full-resolution images. Alternatively, the first computer 102 can coordinate with the storage service 112 to retrieve an image that is requested to be processed by the image recognition service 100. That is, the full-resolution image 144 can be processed by one or more of the neural networks (120, 122, 124, 126, and/or 128) in response to an operator of the image recognition service 100 or in response to a request from the client device 110. Alternatively, an application running on the first computer 102 or an application running on a different computer can request the full-resolution image 144 to be processed by one or more of the neural networks as part of one or more artificial intelligence model (e.g., DL model, ML model, or the like). For example, an application can request the full-resolution image 144 to be processed by multiple computer vision tasks of a DL algorithm. Alternatively, the neural networks 120, 122, 124, 126, and/or 128 may include, but are not limited to, convolutional neural networks, region-based convolutional neural networks, deep neural networks, or the like.

The image recognition service 100 and the storage service 112 may be implemented with one or more server computing devices. The server computing devices may include multiple physical machine and/or multiple virtual machines hosted by one or more physical machines. The physical machines may be rackmount servers, desktop computers, or other computing devices. In one embodiment, the server computing devices may include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is the Amazon Elastic Compute Cloud (EC2®), developed by Amazon.com, Inc. of Seattle, Wash. In one embodiment, the storage service 112 may be the Amazon S3® storage service, developed by Amazon.com, Inc. The one or more server computing devices may host one or more WAN accessible services, which may be web based services and/or cloud services (e.g., a web based service hosted in a cloud computing platform). Alternatively, other IaaS layers, cloud services, storage services, web based service may be used for the image recognition service 100 and/or the storage service 112. It should also be noted that although the first computer 102, the second computer 104, and the third computer 106 are described with respect to an image recognition service, the first computer 102, the second computer 104, and the third computer 106 may be implemented as a distributed network where network traffic between the computers is important.

Figure 2:
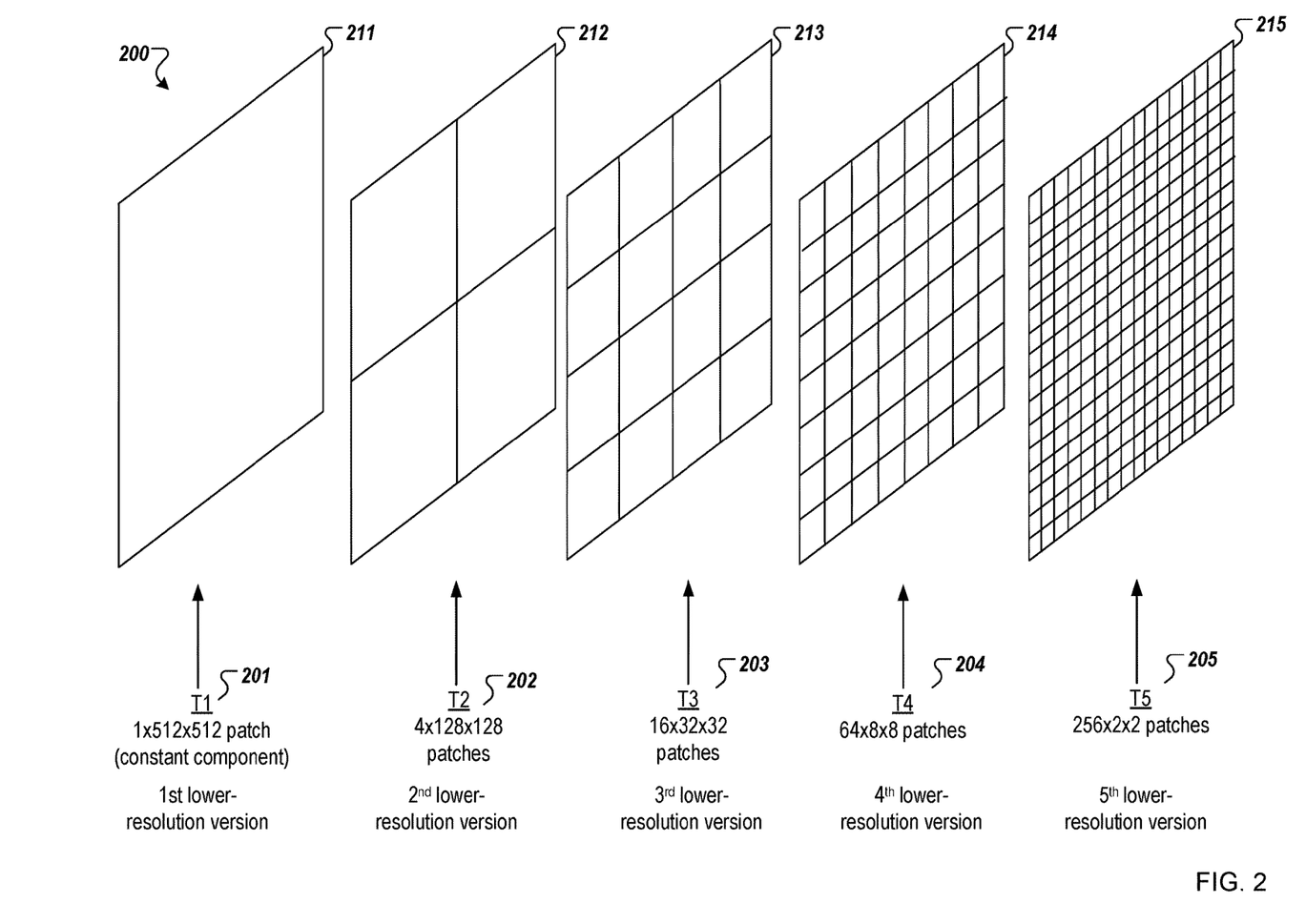
FIG. 2 illustrates multiple lower-resolution versions of an image to be transferred from a first computer to a second computer for an image identification process according to one embodiment.

The neural network 122 may be a convolution neural network having multiple processing layers (e.g., multiple sets of operations) configured to detect one or more objects or concepts in an image. A first layer of the convolution neural network can start the process the first lower-resolution version of the image. The first layer can then process the second lower-resolution version of the image. The first layer can continue to process the sequentially transferred lower-resolution versions, such as illustrated in FIG. 2. The output may eventually be a final classification represented by a feature map of the image. For example, the feature map may indicate that the image includes a "dog." Alternatively, there may be multiple feature maps that are aggregated and analyzed to generate one or more final classification in the image. In one embodiment, the deep neural network can output a final result or classification of a deep learning processing indicating whether one or more objects are detected in the image and specify one or more classifications of objects detected in the image.

FIG. 2 illustrates multiple lower-resolution versions 200 of an image to be transferred from a first computer to a second computer for an image identification process according to one embodiment. In one embodiment, the CV image interlacing codec 148 of the patch-based streaming engine 146 generates the multiple lower-resolution versions of the image. The multiple-lower-resolution versions of the image may be the lower-resolution images 154 of the full-resolution image 144 described above with respect to FIG. 1. The image and the lower-resolution versions 200 of the image can be represented as various types of data primitives, such as elements, pixels, patches, tensor, and/or tiles. For example, an element may be a single scalar value that can be used to represent color intensity, luminance, or chrominance. A pixel is a vector of elements representing the characteristics of a position in an image. There are various types of formats of pixels. An image is a data structure containing multiple pixels that can be addressed. The image size depends on the resolution. A patch is a subset of an image that can be used as an input to an image processing task or a computer vision task. Some algorithms process overlapping patches. In some cases, a patch can be a group of pixels of an image, such as N×N pixels where N is a positive integer. The patch can be used to detect an object in an image and track the object over a series of images where the object is stationary or in motion through the series of images. A patch can be described as a block of an image (overlapping or non-overlapping blocks). The patch can be used to get local information by sub-dividing the image into a number of blocks. A tensor is a set of patches arranged in a stack to form a 3D structure. The tensor can be constructed from patches originating in different images in a video stream or patches coming from different parts of the same image. A tensor can be used to aggregate data from multiple patches to produce a single output patch (or pixel). A tile can be subsets of non-overlapping regions of an image. Tiles can be used to store image data in memory, such as a single cache line as a unit of data transfer. Image processing tasks or computer vision tasks can operate on different patches in parallel. For example, a 3×3 patch of an image can produce each output pixel during convolution and the output pixels can be computed in parallel.

Computer vision mainly involves segmentation, recognition, and reconstruction to give scene understanding. Computer vision may employ image processing and machine learning to do any of the steps above. Image processing is focused on processing raw images without any given knowledge feedback. For example, to perform semantic image segmentation as a computer vision task, the processing logic might apply some filtering to the image during the process (image processing task) or try to recognize the objects in the scene (machine learning task). Image processing tasks may include filtering, pixel processing, multispectral, multimodal, image enhancement, segmentation, registration, object shape modeling, multi-image stitching, panorama generation, image generation, 2D/3D projection, 3D graphics, game rendering engines, or the like. Computer vision may employ different artificial intelligence techniques to detect, identify, and/or track one or more objects in the image, such as pattern recognition, machine learning, semantic ontologies, kalman filters, model object kinematics to predict behavior.

In one embodiment, the CV image interlacing codec 148 of the patch-based streaming engine 146 processes the full-resolution image to extract image data to be represented as one or more patches in a lower-resolution image. A patch is a 2D (or 3D) data structure and one or more patches can be used to represent an image, which is a 2D data structure composed of individual pixels that can be addressed using Cartesian coordinates. When the lower-resolution image include multiple patches, the patches are represented with origin coordinates relative to the image origin coordinate and patch width and patch height. The patch can be operated on by an IP/CV computational kernel of a neural network. For example, a 3×3 convolution kernel requires a 2D patch of 9 pixels from the image to compute a single output pixel. The image can be represented as multiple tiles as a physical view of memory, whereas the patches can be represented as a logical view of memory and the patches may span multiple tiles.

Referring back to FIG. 2, the CV image interlacing codec 148 generates the multiple lower-resolution versions 200 have increasingly greater resolutions over time. The multiple lower-resolution versions 200 can be sequentially transferred between a first computer and a second computer over a network. In particular, the CV image interlacing codec 148, at a first time T1 201, generates a first lower-resolution version 211 of the image. At a second time T2 202, the CV image interlacing codec 148 generates a second lower-resolution version 212 of the image. At a third time T3 203, the CV image interlacing codec 148 generates a third lower-resolution version 213 of the image. At a fourth time T4 204, the CV image interlacing codec 148 generates a fourth lower-resolution version 214 of the image. At a fifth time T5 205, the CV image interlacing codec 148 generates a fifth lower-resolution version 215 of the image.

Figure 3:
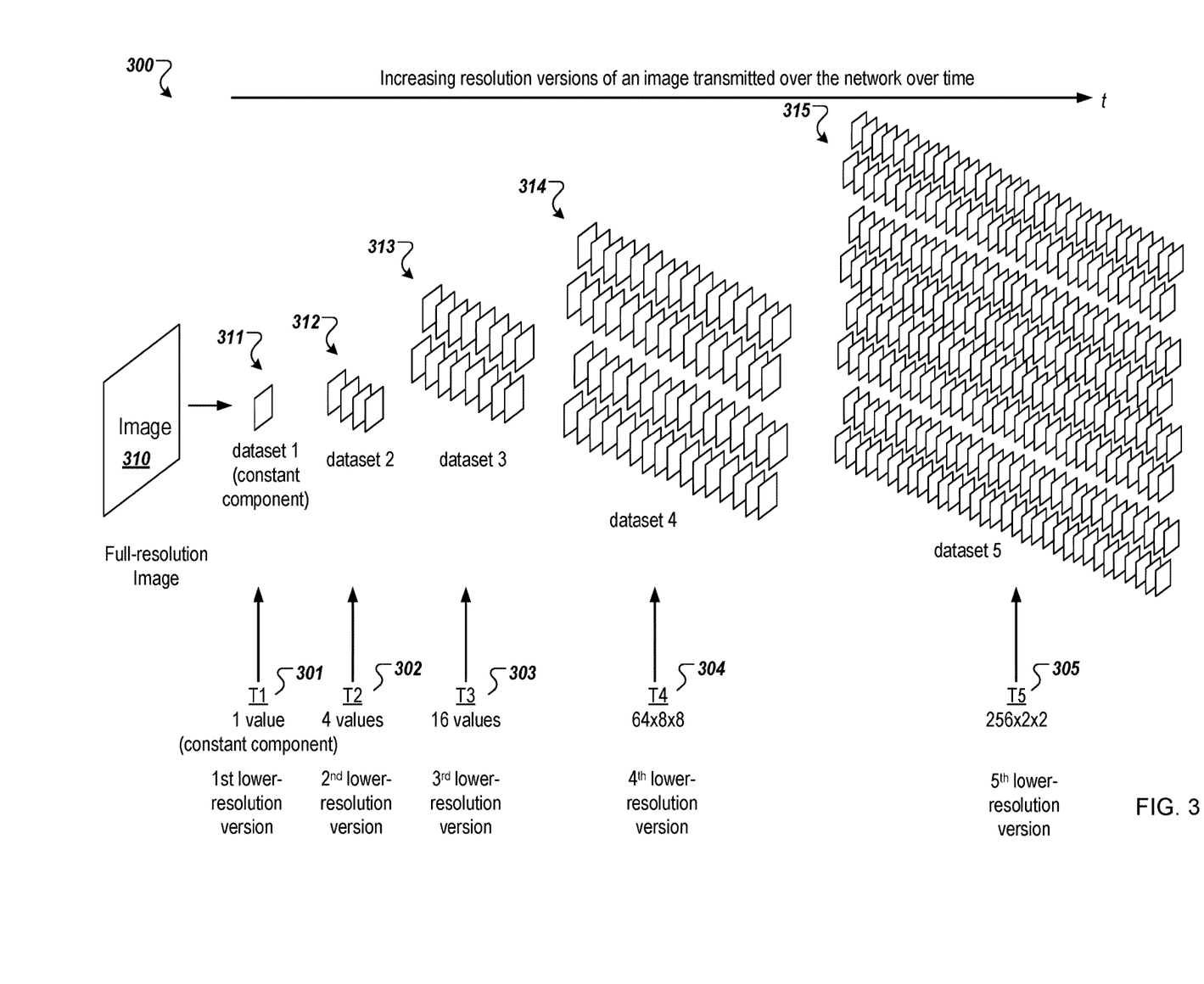
FIG. 3 illustrates datasets of multiple lower-resolution versions of a full-resolution image to be sequentially transferred between a first computer and a second computer over a network according to one embodiment.

In the depicted embodiment, the first lower-resolution version 211 can be a single patch, such a mean value of a patch of 512×512 pixels (1×512×512 patch). The 512×512-sized patch can be a single pixel value representing a constant component of the entire image. The second lower-resolution version 212 can be four mean values of four patches of 128×128 pixels each (e.g., 4×128×128 patches). The third lower-resolution version 213 can be sixteen mean values of sixteen 32×32-sized patches (e.g., 16×32×32 patches). The fourth lower-resolution version 214 can be sixty-four 8×8-sized patches (e.g., 64×8×8 patches). The fifth lower-resolution version 215 can be two-hundred and fifty-six 2×2-sized patches (e.g., 256×2×2 patches). In another embodiment, the patch size of the codec, such as a JPEG codec that uses an 8×8 patch size, can define the size of the patches of the image. The first-lower resolution version 211 and the second lower-resolution version 212 can be multiple patches of a fixed patch size. Alternatively, other number of patches and patch sizes can be used for transferring lower-resolution versions of an image between the first computer and the second computer. When transferring a JPEG file, a transport layer may transfer data corresponding to the frequency components of an image in a first order. Using the embodiments described herein, the order in which different frequency components of the image are provided to a transport layer is controlled by the patch-based streaming engine as described herein. The patch-based streaming engine can control the amount of data prepared for the transport layer in a way that less data is initially sent to the second computer so that the second computer can start the computer vision task sooner than it would take to transfer the entire JPEG file. The patch-based streaming engine can subsequently transfer subsequent versions of the image having increasingly greater resolution to the second computer until completion of the computer vision task or until terminated by the second computer. The amount of data transferred between the first computer and the second computer increases over time, such as illustrated in FIG. 3. The computer vision task (or other image processing task) of an image identification process performed by the second computer can process the lower-resolution images that are sequentially transferred to the second computer from the first computer.

FIG. 3 illustrates datasets of multiple lower-resolution versions 300 of a full-resolution image 310 to be sequentially transferred between a first computer and a second computer over a network according to one embodiment. In one embodiment, the first computer 102 (e.g., patch-based streaming engine 146) generates the multiple lower-resolution versions 300 have increasingly greater resolutions over time. The multiple lower-resolution versions 300 can be sequentially transferred between a first computer and a second computer over a network. In particular, first computer 102, at a first time T1 301, generates a first lower-resolution version 311 of the image 310. The first lower-resolution version 311 can be a first dataset (e.g., a constant component of the image 310). For example, the first data set includes a single patch value that represents a mean value of the image 310. The pixels can be represented as N-bit color or N-bit greyscale. A greyscale digital image is an image in which the value of each pixel is represented as a grey level or grey value. A grey level or grey value indicates the brightness of a pixel. The minimum grey level is 0 and the maximum grey level depends on the digitization depth of the image. For example, an 8-bit deep image is 255. The mean value may be a number between 0 and 255. If the image 310 were a greyscale image, the first dataset may include a single N-bit grey level that represents the mean of the image 310. Similarly, N-bit values can be used to represent color pixels and the patch values can be a mean value for each set of pixels in a block of the image.

At a second time T2 302, the first computer 102 generates a second lower-resolution version 312 of the image 310. The second lower-resolution version 312 can be a second dataset, e.g., four patch values. For the second lower-resolution version 312, the image 310 can be processed with a different level of granularity than a single mean value for the entire image for the first lower-resolution version 311. The image 310 can be divided into 4 blocks and the mean value of each of the blocks can be determined. The second data set can include the four mean values (also referred to as patch values). At a third time T3 303, the first computer 102 generates a third lower-resolution version 313 of the image 310. The third lower-resolution version 313 can be a third dataset, e.g., sixteen patch values. At a fourth time T4 304, the first computer 102 generates a fourth lower-resolution version 314 of the image 310. The fourth lower-resolution version 314 can be a fourth dataset, e.g., sixty-four patch values. At a fifth time T5 305, the first computer 102 generates a fifth lower-resolution version 315 of the image 310. The fifth lower-resolution version 315 can be a fifth dataset, e.g., 256 patch values. The subsequent datasets can represent different frequency components of the image. Although not drawn to scale, the datasets being transferred increase in size over time. However, given the size of the first dataset, the second computer 104 can start the computer vision task earlier in time than a time it would take to transfer the full-resolution image 310. The second computer 104 can perform progressive resolution processing, as compared to task-based processing of a full-resolution image.

In one embodiment, the individual datasets can be transferred as individual matrix with the patch values. In another embodiment, a difference matrix can be transferred, the difference matrix representing a difference between a first matrix representing a one lower-resolution version and another lower-resolution version. For example, a base layer can be transferred and the additions/subtractions to values in the base layer can be sent in a difference matrix. The first computer 102 can perform a comparison between two matrices to generate the difference matrix. Comparisons of matrices by the first computer or the second computer can include a statistical analysis of the matrices (e.g., the computation set including a two-dimensional or three-dimensional tensor table having encoded values resulting from application of a layer) to determine a difference matrix representing a level or amount of difference between the two matrices.

In one implementation, a deep neural network includes a trained model, including learned filters to detect objects. The first stages of the deep neural network can process small areas or regions of an image to detect simple features in the those areas, such as edges, curves, or the like, and subsequent stages perform additional processing to detect more complex features in the image based on the detected simple features. For example, the complex features may include faces, noses, and eyebrows of a person. As described above, just like a person can start to detect simple features, complex features, or objects in a partially received image that is interlaced, the deep neural network may start to detect simple features, complex features, or objects in the lower-resolution versions 300 of the full-resolution image 310 without downloading the full-resolution image 310 completely. That is, the deep neural network can start and possibly complete a computer vision task with some of the lower-resolution versions 300. In essence, the CV image interlacing used to encode the lower-resolution versions 300 can permit the second computer 104 to figuratively see a degraded copy of the entire image for performing a computer vision task (or other image processing task) of an image identification process (or other processes of DL or ML algorithms). In a specific implementation where convolution neural networks are used, the convolution is performed on an entire image, but a first stage of the convolution neural network can process a lower-resolution version of the entire image. By sequentially transferring the lower-resolution versions with increasingly greater resolutions to the second computer 104, the deep neural network may be able to "answer the question," such as detect an object or feature of an object in the image, without analyzing the full-resolution image 310.

In one embodiment, the matrix being transferred as one of the lower-resolution versions can be a 2D matrix or even a tensor or three-dimensional table. The tensor or three-dimensional table can include data blocks that may be mapped to data blocks in another layer of the DL model. For example, the layer-by-layer processing of the image may result in multiple matrices corresponding to image at different resolutions of the image. In one embodiment, the matrix is generated by a dataset generator (not illustrated) of the patch-based streaming engine 146 to include a table of encoded values associated with the level of granularity of the image 310. The image identification process at the second computer 104 can push the lower-resolution versions of the image through a computation set generator including multiple layers. A first layer can process the respective lower-resolution version and output a matrix that represents the result of the processing of the respective lower-resolution version and a subsequent layer may process the output matrix from one or more previous layers to generate a new matrix associated with that subsequent layer.

In another embodiment, any version of the image is processed at each layer and the output of one layer may be provided as an input to another layer. For example, application of the set of operations representing a second layer (L2) may generate data about the image that is added to the data generated as a result of the application of the set of operations representing a first layer (L1). For example, a first layer (L1) may analyze 9 pixels of the version of the image, a second layer may analyze 81 pixels of the version of the image, a third layer may analyze 243 pixels of the image, and so on. In one embodiment, as the processing continues from layer to layer, the neural network is "zooming" out so that a greater number of pixels are examined at each layer. In another embodiment, one lower-resolution version is input into a first layer and another lower-resolution version is input into a second layer. The output of the first layer may also be input into the second layer. In another embodiment, the smaller datasets can be input into the first layer or first layers of the model, since the first layers each have a relatively small receptive field to analyze a lower-resolution version of the image. For subsequent layers, the receptive field may increase, taking into account more image data in the increasingly greater resolutions of the versions and building upon computations performed with respect to the processing of the previous layers.

In one embodiment, with reference to FIGS. 2-3, an amount of operations performed by each layer of the neural network 120 is proportional to the dataset size representing the respective lower-resolution version of the image. Accordingly, in one embodiment, a large portion of the operations are performed by the subsequent layers of the model. For example, an amount of work performed by a given layer is represented by a product of the numbers describing the image size (e.g., the amount of work performed by a first layer 1 may be represented by the product of 224×224×3). In one embodiment, the amount of work performed by a layer may be a function of a number of parameters processing by the layer.

Methods 400, 500, 600, or 700 of FIGS. 4-7 may be performed by processing logic that may comprise hardware (e.g., circuitry, dedicated logic, programmable logic, microcode, etc.), software (e.g., instructions run on a processing device), or a combination thereof. In one embodiment, the second computer 104 of FIG. 1 performs the methods 400, 500, 600, or 700. In another embodiment, the patch-based streaming engine 156 of FIG. 1 performs the methods 400, 500, 600, or 700. Alternatively, other components of the image recognition service can perform some or all of the operations of the methods 400, 500, 600, or 700.

Figure 4:
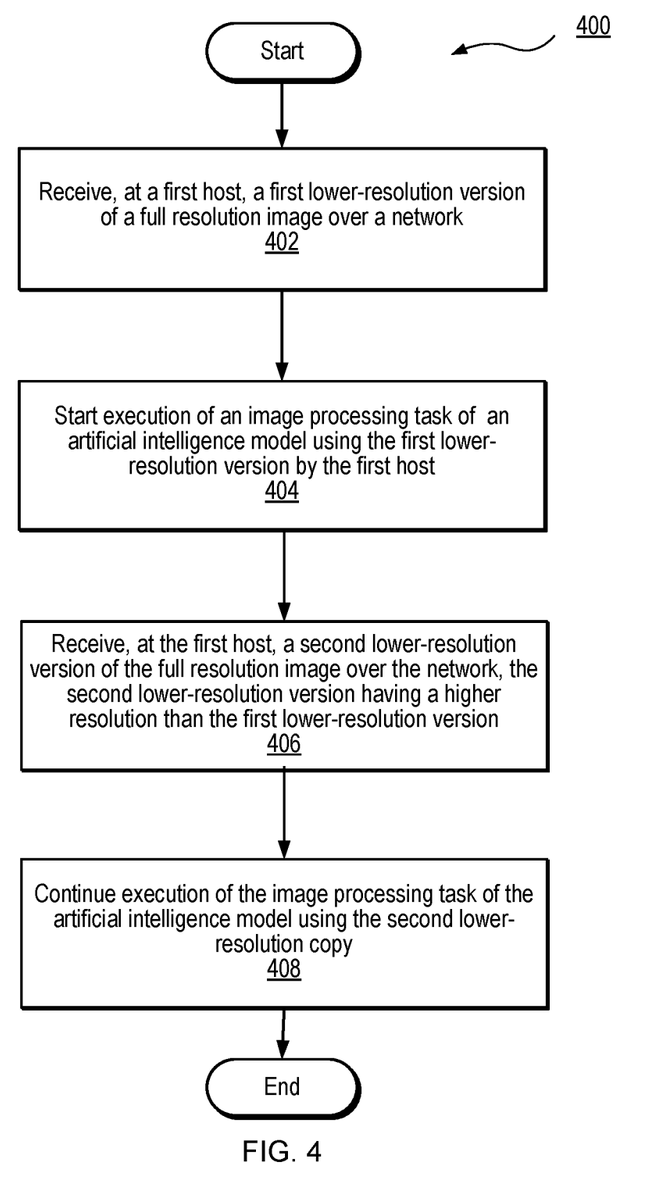
FIG. 4 is a flow diagram illustrating a method for sequentially receiving a first version of the image and a second version of the image, the second version having a higher resolution than a first resolution of the first version, for executing an image processing task of an artificial intelligence model according to one embodiment.

FIG. 4 is a flow diagram illustrating a method 400 for sequentially receiving a first version of the image and a second version of the image, the second version having a higher resolution than a first resolution of the first version, for executing an image processing task of an artificial intelligence model according to one embodiment. The processing logic begins the method 400 by receiving a first lower-resolution version of a full-resolution image over a network (block 402). At block 404, the processing logic starts execution of an image processing task of an artificial intelligence model using the first lower-resolution version. At block 406, the processing logic receives a second lower-resolution version of the full-resolution image over the network. The processing logic continues execution of the image processing task using the second lower-resolution version (block 408); and the method 400 ends. The artificial intelligence model may be a deep learning model, a machine learning model, or the like.

In a further embodiment, the processing logic as part of the method 400 decompresses a compressed file to extract the first lower-resolution version of the image for processing by the image processing task describe above.

Figure 5:
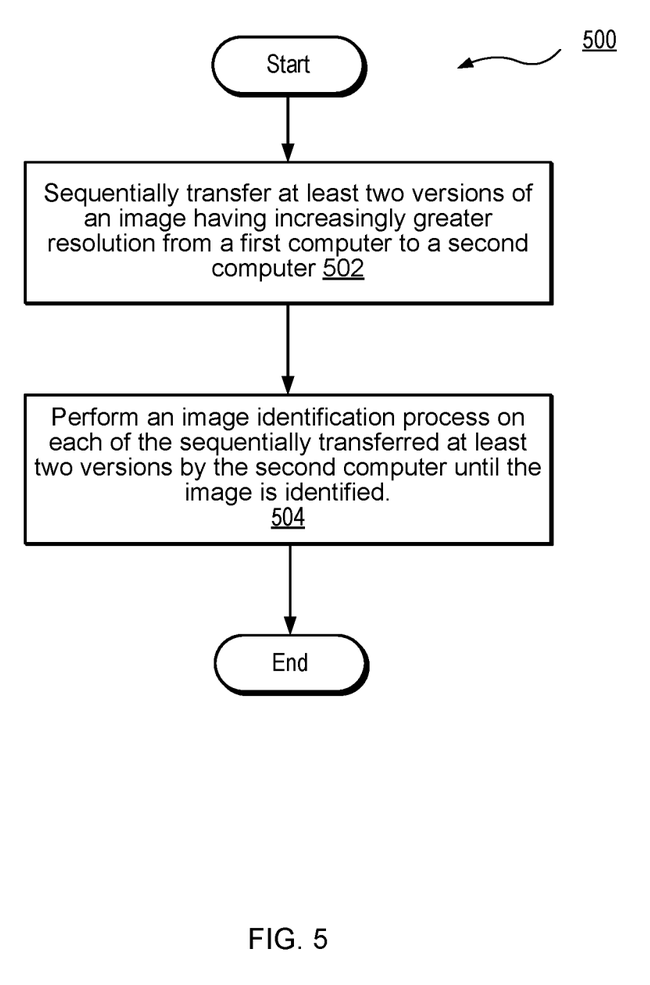
FIG. 5 is a flow diagram illustrating a method for sequentially transferring at least two versions of an image having increasingly greater resolution from a first host to a second host according to one embodiment.

FIG. 5 is a flow diagram illustrating a method 500 for sequentially transferring at least two versions of an image having increasingly greater resolution from a first computer to a second computer according to one embodiment. The processing logic of a first computer begins the method 500 by sequentially transferring at least two versions of an image having increasingly greater resolution from the first computer to a second computer (block 502) Processing logic of the second computer performs an image identification process on each of the sequentially transferred at least two versions by the second computer until the image is identified (block 504); and the method 500 ends.

In a further embodiment, the processing logic at block 504 processes each of the sequentially transferred at least two versions by a neural network until the neural network identifies the image. The neural network may be a deep neural network, a convolution neural network, or the like. To process each of the sequentially transferred versions, the processing logic applies a first set of operations of the neural network to a first version of the image to obtain a first result, the first version having a first resolution that is less than a full-resolution of the image stored at the first computer. The processing logic also applies the first set of operations of the neural network to a second version of the image to obtain a second result, the second version having a second resolution that is greater than the first resolution and less than the full-resolution image. In a further embodiment, the processing logic can apply a second set of operations of the neural network to the first result and the second result. The processing logic can repeat this for each of the versions having an increasingly greater resolution until the image is identified.

In one embodiment, the processing logic terminates the sequential transferring of the at least two version of the image when the neural network identifies the image. In another embodiment, processing logic of the second computer transfers a notification to the first computer, the notification indicating that the image is identified by the second computer. Processing logic at the first computer terminates the generation and transfer for additional versions of the image by the first computer, in response to the notification. In another embodiment, the processing logic receives an indication of completion of the image identification process from the second computer. The processing logic stops the sequential transfer of the at least two version of the image from the first computer and the second computer in response to the indication of completion being received.

In another embodiment, to process each of the sequentially transferred versions, the processing logic applies a first set of operations of the neural network to a first version of the image to generate a first tensor table and applies the first set of operations of the neural network to a second version of the image to generate a second tensor table.

In another embodiment, the neural network has a trained model, e.g., a deep learning model, a machine learning model, or other types of artificial intelligence models.

In another embodiment, the processing logic decodes a compressed image file stored at the first computer. The compressed image file stores the image at full resolution. The processing logic generates a first resolution version of the image from the decoded image data, the first resolution version having a first resolution lower than the full resolution. The processing logic generates a second resolution version of the image from the decoded image data, the second resolution version having a second resolution lower than the full resolution and higher than the first resolution. The first resolution version is transferred to the second computer 104 and the second resolution version is transferred after the first resolution version.

In another embodiment, the processing logic decodes a compressed image file stored at the first computer. The compressed image file stores the image at full resolution. The processing logic generates a first matrix of values corresponding to a first resolution version of the image from the decoded image data. The processing logic transfers the first matrix from the first computer to the second computer. The processing logic generates a second matrix of values corresponding to a second resolution version of the image from the decoded image data. The processing logic may transfer the second matrix to the second computer. Alternatively, the processing logic can compare the first matrix and the second matrix to obtain a difference matrix and transfer the difference matrix to the second computer.

Figure 6:
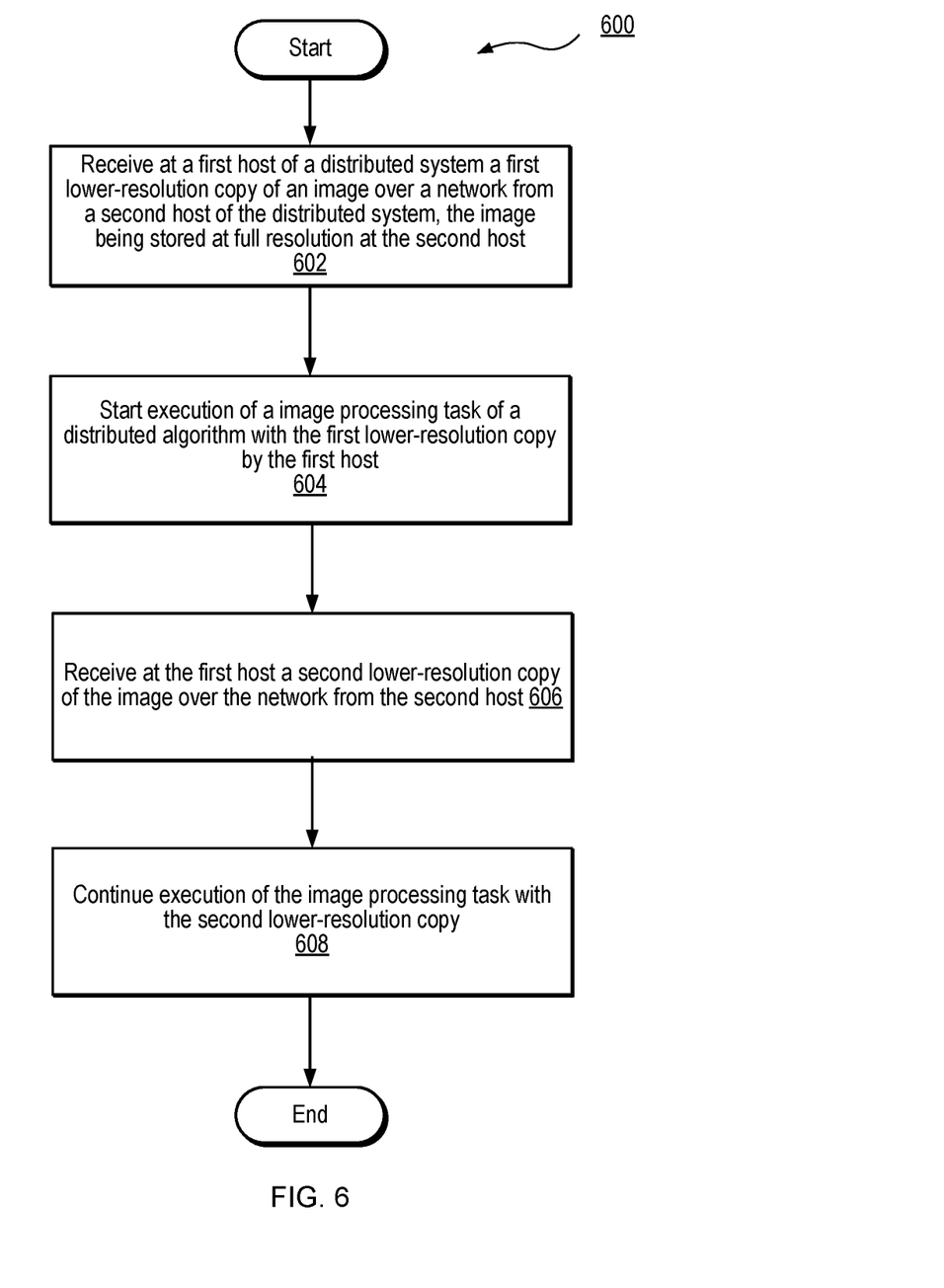
FIG. 6 is a flow diagram illustrating a method for sequentially transferring at least two versions of an image having increasingly greater resolution from a first host to a second host according to another embodiment.

FIG. 6 is a flow diagram illustrating a method 600 for sequentially transferring at least two versions of an image having increasingly greater resolution from a first host to a second host according to one embodiment. The processing logic of a first computer begins the method 600 by receiving at a first host a first lower-resolution version of a full resolution image over a network (block 602). The processing logic at the first host starts execution of an image processing task of an artificial intelligence model using the first lower-resolution version (block 604). The processing logic at the first host receives, a second lower-resolution version of the full resolution image over the network, the second lower-resolution version having a higher resolution than the first lower-resolution version (block 606). The processing logic continues execution of the image processing task of the artificial intelligence model using the second lower-resolution copy (block 608). The processing logic can continue to receive sequential versions of the image having increasingly greater resolutions until the image is identified or the image processing task completes. Upon completion the processing logic can send a notification of an indication of completion to the second host sending the sequentially transferred versions having the increasingly greater resolutions.

In another embodiment, processing logic at a first host receives a first lower-resolution version of a full resolution image over a network. The processing logic starts execution of an image processing task of a machine learning model using the first lower-resolution version. The processing logic receives a second lower-resolution version of the full resolution image over the network, the second lower-resolution version having a higher resolution than the first lower-resolution version. The processing logic continues execution of the image processing task of the machine learning model using the second lower-resolution copy.

In another embodiment, processing logic of a first host extracts a first patch of an image and sends the first path to a second host over a network using a patch-based streaming protocol. The second host performs an image processing tasks (or computer vision task) on the first patch before a last patch of the image is received. In another embodiment, the processing logic segments an image into a plurality of patches and sends a first patch to a second host over the network using a patch-based streaming protocol. The second host may be hosting a DL algorithm to start image processing of the first patch. The second host can start the image processing without waiting for a full resolution image to be downloaded to the second host. In a further embodiment, the first host sends a second patch to the host over the network using the patch-based streaming protocol. The second host can start image processing of the second patch before a last patch of the image is received. In another embodiment, the host starts segmenting an image into a plurality of patches and while continuing the segmenting the image, the processing logic sends a first patch to a second host over the network. In this manner, the second host can start to process the image before a time it would take a full resolution version of the image can be transferred to the second host. In another embodiment, the first host receives a request to process an image. The first host communicates a first patch of the image to a second host to perform a computer vision task on the image. The first patch may represent a lower-resolution version of the image. In another embodiment, the first host sends multiple patches, the multiple patches representing the lower-resolution version.

Figure 7:
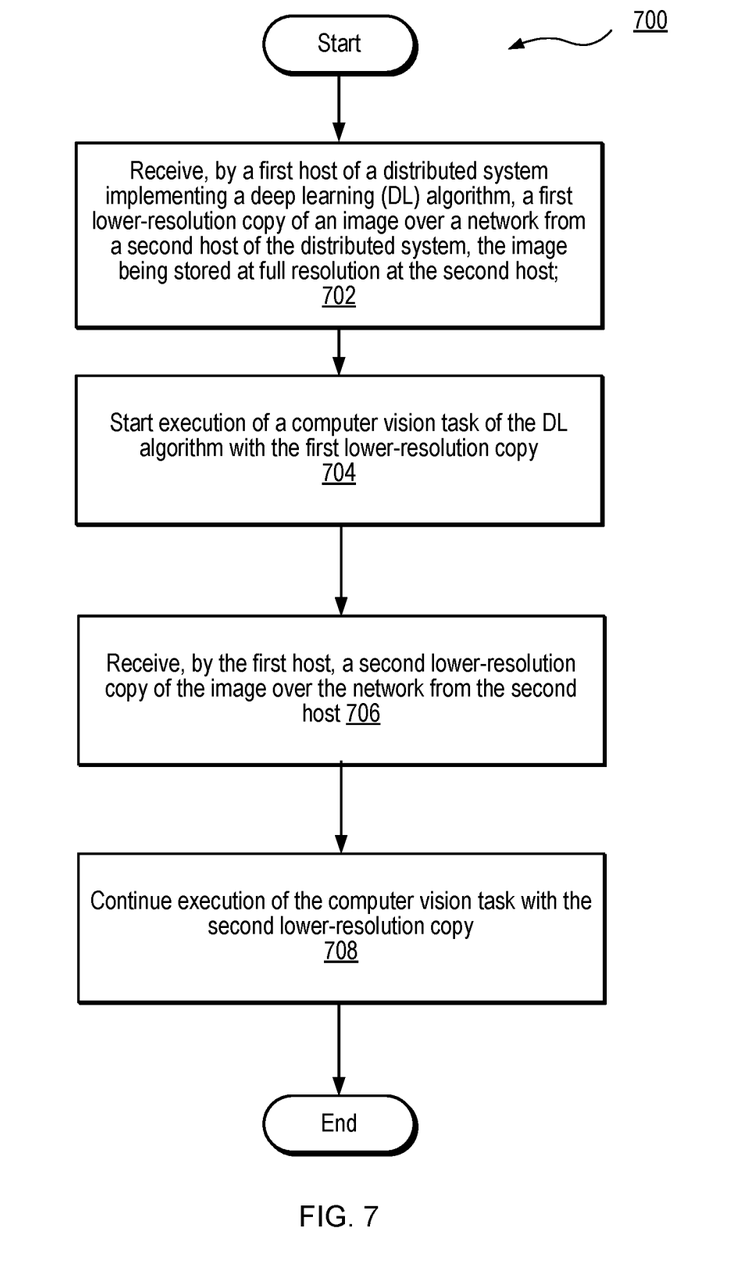
FIG. 7 is a flow diagram illustrating a method for sequentially transferring at least two versions of an image having increasingly greater resolution from a first host to a second host according to another embodiment.

FIG. 7 is a flow diagram illustrating a method 700 for sequentially transferring at least two versions of an image having increasingly greater resolution from a first host to a second host according to another embodiment. The processing logic of a first computer begins the method 700 by receiving at a first host of a distributed system receives a first lower-resolution copy of an image over a network from a second host of the distributed system, the image being stored at full resolution at the second host (block 702) The processing logic starts execution of a image processing task of a distributed algorithm with the first lower-resolution copy by the first host (block 704). The processing logic receives at the first host a second lower-resolution copy of the image over the network from the second host (block 706) and continues execution of the image processing task with the second lower-resolution copy (block 708). In a further embodiment, the first host starts the execution of the image processing task earlier in time than it would take the image at full resolution to be completely transferred to the first host from the second host. In one embodiment, the image processing task is part of an artificial intelligence model. The processing logic continues execution of the image processing task of the artificial intelligence model at block 708 using the second lower-resolution copy once received. The processing logic can process the same image using a different neural network or can be used to perform a different task of the same neural network.

Figure 8:
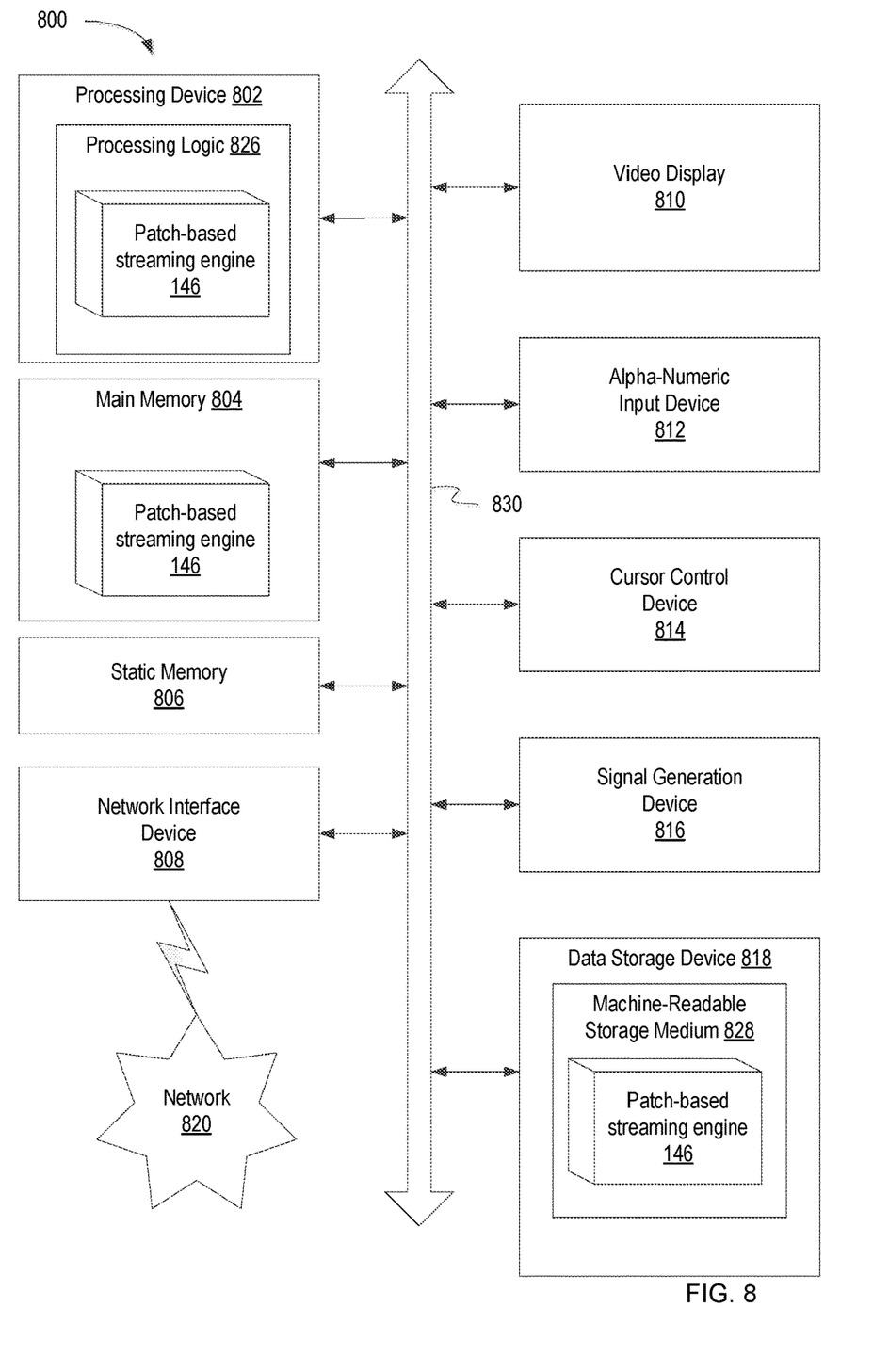
FIG. 8 illustrates a diagrammatic representation of a machine in the example form of a computer system 800 including a set of instructions executable by a computer to sequentially transfer versions of image having increasingly greater resolutions to another computer according to any one or more of the methodologies discussed herein.

FIG. 8 illustrates a diagrammatic representation of a machine in the example form of a computer system 800 including a set of instructions executable by a computer to sequentially transfer versions of image having increasingly greater resolutions to another computer according to any one or more of the methodologies discussed herein. In one embodiment, the computer may include instructions to enable execution of the processes and corresponding components shown and described in connection with FIGS. 1-7.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. In various implementations of the present disclosure, the processing device 802 is configured to execute instructions for the neural network 120 for performing the operations and processes described herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 (or machine-readable medium) on which is stored one or more sets of instructions of the neural network 120 embodying any one or more of the methodologies or functions described herein. The instructions may also reside, completely or at least partially, within the main memory 804 and/or within processing logic 826 of the processing device 802 during execution thereof by the computer system 800, the main memory 804 and the processing device 802 also constituting computer-readable media.

The instructions may further be transmitted or received over a network 820 via the network interface device 808. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, at a first host, a first lower-resolution version of a full-resolution image over a network;
starting an execution of an image processing task of an artificial intelligence model using the first lower-resolution version by the first host, wherein the artificial intelligence model is trained to detect an object, wherein starting the execution comprises applying a first set of operations to the first lower-resolution version using a first set of learned parameter values, the first set of learned parameter values corresponding to a first layer of the artificial intelligence model;
receiving, at the first host, a second lower-resolution version of the full-resolution image over the network, the second lower-resolution version having a higher resolution than the first lower-resolution version;
continuing the execution of the image processing task of the artificial intelligence model using the second lower-resolution version, wherein continuing the execution comprises applying the first set of operations to the second lower-resolution version using the first set of learned parameter values, the first set of learned parameter values corresponding to the first layer of the artificial intelligence model;
receiving one or more additional lower-resolution versions of the full-resolution image over the network, each of the one or more additional lower-resolution versions having a higher resolution than a previous lower-resolution version;
continuing the execution of the image processing task of the artificial intelligence model using the one or more additional lower-resolution versions by inputting the one or more additional lower-resolution versions into an input layer to perform the first set of operations using the first set of learned parameter values;

determining that the image processing task is complete before receiving the full-resolution image over the network; and sending a notification over the network to terminate generation of additional lower-resolution versions of the full-resolution image to send over the network and stop sending additional-lower resolution versions of the full-resolution image already generated in response to determining that the image processing task is complete.

2. The method of claim 1, wherein the artificial intelligence model is a deep learning model.

3. The method of claim 1, wherein the artificial intelligence model is a machine learning model.

4. The method of claim 1, wherein the first lower-resolution version is stored in a compressed file, and wherein the method further comprises decompressing the compressed file to extract the first lower-resolution version of the full-resolution image for processing by the image processing task.

5. A system comprising:

a processing device to execute a neural network comprising an input layer, an output layer, and one or more hidden layers between the input layer and the output layer, wherein the neural network is a trained model to detect an object in an image; and a memory to store computer-executable instructions that, if executed, cause the processing device to:

receive a first resolution version of the image over a network from a computer that stores the image at full resolution;

start an image identification process by the neural network with the first resolution version by inputting the first resolution version into the input layer to perform a first set of operations using a first set of learned parameter values;

sequentially receive one or more additional resolution versions of the image having increasingly greater resolution than the first resolution version from the computer;

continue the image identification process with the one or more additional resolution versions of the image by inputting the one or more additional resolution versions into the input layer to perform the first set of operations using the first set of learned parameter values;

determine that the image identification process is complete before receiving the image at the full resolution; and send a notification to the computer over the network to terminate generation of the one or more additional resolution versions to sequentially transfer and stop sending additional-lower resolution versions of the image at full-resolution already generated, in response to determining that the image identification process is complete.

6. The system of claim 5, wherein the one or more additional resolution versions comprises a second resolution version having a higher resolution than the first resolution version and a lower resolution than the full resolution.

7. The system of claim 6, wherein the neural network is a deep neural network, wherein the processing device, to perform the image identification process, is to:

apply the first set of operations, corresponding to input layer, to the first resolution version to obtain a first result; and apply the first set of operations to the second resolution version to obtain a second result.

8. The system of claim 7, wherein the processing device, to perform the image identification process, is to apply a second set of operations, corresponding to a second layer of the deep neural network, to the first result and the second result.

9. The system of claim 5, wherein the neural network is a deep neural network that includes the trained model to detect the object in the image using the first resolution version and the one or more additional resolution versions.

* * * * *